United States Patent
Aurongzeb et al.

(10) Patent No.: US 10,101,772 B2
(45) Date of Patent: Oct. 16, 2018

(54) PROTECTIVE COVER AND DISPLAY POSITION DETECTION FOR A FLEXIBLE DISPLAY SCREEN

(71) Applicant: Dell Products, LP, Round Rock, TX (US)

(72) Inventors: Deeder M. Aurongzeb, Austin, TX (US); John Trevor Morrison, Round Rock, TX (US); Lawrence E. Knepper, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 1033 days.

(21) Appl. No.: 14/494,966

(22) Filed: Sep. 24, 2014

(65) Prior Publication Data
US 2016/0085268 A1    Mar. 24, 2016

(51) Int. Cl.
  *H05K 7/00* (2006.01)
  *H05K 5/00* (2006.01)
  *G06F 1/16* (2006.01)

(52) U.S. Cl.
  CPC .......... *G06F 1/1652* (2013.01); *G06F 1/1677* (2013.01)

(58) Field of Classification Search
  CPC .................................................... G02F 1/1333
  USPC .................................................... 361/679.21
  See application file for complete search history.

(56) References Cited

U.S. PATENT DOCUMENTS

| | | |
|---|---|---|
| 6,094,341 A | 7/2000 | Lin |
| 7,136,282 B1 | 11/2006 | Rebeske |
| 7,821,780 B2 | 10/2010 | Choy |
| 8,261,212 B2 | 9/2012 | Wigdor |
| 9,123,279 B2 | 9/2015 | Yeh |
| 2003/0142469 A1 | 7/2003 | Ponx |
| 2005/0237269 A1 | 10/2005 | Connor et al. |
| 2006/0026535 A1 | 2/2006 | Hotelling et al. |
| 2006/0109259 A1 | 5/2006 | Ohta |
| 2009/0296331 A1 | 12/2009 | Choy |
| 2010/0031203 A1 | 2/2010 | Morris et al. |

(Continued)

FOREIGN PATENT DOCUMENTS

WO   WO 2012/044516 A2   4/2012
WO   WO 2013/107318 A1   7/2013

OTHER PUBLICATIONS

Patently Apple, Jack Purcher, "Hidden Apple Patent for Flexible Display Devices Discovered," Jan. 11, 2014, 9 Pages, http://www.patentlyapple.com/patently-apple/2014/01/hidden-apple-patent-for-flexible-display-devices-discovered.html.

(Continued)

*Primary Examiner* — Jerry Wu
(74) *Attorney, Agent, or Firm* — Prol Intellectual Property Law, PLLC; H. Kenneth Prol (57) ABSTRACT

An information handling system includes a flexible display screen, first and second display platforms, and a coating. The flexible display screen includes first and second surfaces, and has a first hardness level. The flexible display screen movably mounted to the first and second display platforms along the first surface. The coating is in physical communication with the second surface of the flexible display screen and includes a first region having a second hardness level greater than the first hardness level of the flexible display screen; and a second region having a third hardness level, the third hardness level being greater than the second harness level.

20 Claims, 8 Drawing Sheets

(56) References Cited

U.S. PATENT DOCUMENTS

| | | |
|---|---|---|
| 2011/0032199 A1 | 2/2011 | Seo et al. |
| 2012/0031439 A1 | 12/2012 | Bohn |
| 2013/0058063 A1 | 3/2013 | O'Brien |
| 2013/0127905 A1 | 5/2013 | Zhang et al. |
| 2013/0201101 A1 | 8/2013 | Niu et al. |
| 2014/0009445 A1 | 1/2014 | Kim et al. |
| 2014/0247198 A1 | 9/2014 | Yang |
| 2014/0287213 A1* | 9/2014 | Lee .................. G02F 1/133308 428/217 |
| 2015/0277110 A1* | 10/2015 | Oh ........................ G06F 3/0412 359/513 |

OTHER PUBLICATIONS

Tablet News, James A., "Apple Patents iPad Smart Magnets, used to Attach Gizmos Like Controllers or Cameras," Feb. 20, 2014, 2 Pages, http://tablet-news.com/2014/02/20/apple-patents-ipad-smart-magnets-used-to-attach-gizmos-like-controllers-or-cameras/.

M. Dong et al., "Power-Saving Color Transformation of Mobile Graphical User Interfaces on OLED-based Displays," ISLPED '09, Aug. 19-21, 2009, 4 Pages.

Luke Dormehl, "Apple's Wrap-Arpund Display Tech Could Kill Off Those Pesky Bezels [Patent]," Feb. 13, 2014, 3 Pages, http://www.cultofmac.com/266383/apples-wrap-around-display-tech-kill-pesky-bezels-patent/.

Patently Apple, Jack Purcher, "Talk About Timing: Apple's iWatch Patent Arrives," Feb. 21, 2013, 12 Pages, http://www.patentlyapple.com/patently-apple/2013/02/talk-about-timing-apples-wristwatch-patent-arrives.html.

HardwareSphere, Ken Xu, "Adonit Jot Touch—The New Pressure Sensitive Stylus for iPad," Jul. 20, 2012, 3 Pages, http://www.hardwaresphere.com/2012/07/20/adonit-jot-touch-the-new-pressure-sensitive-stylus-for-ipad/.

Thomas Ricker, "ASUS DR-570 color e-book reader gets detailed," Jan. 18, 2010, 1 Page, http://www.engadget.com/2010/01/18/asus-dr-570-color-e-book-reader-gets-detailed/.

N. Ravi, J. Scott, H. Lu, L. Iftode, "Context-aware Battery Management for Mobile Phones," In Pervasive Computing and Communications, p. 224-233, 2008, p. 1-10.

Marek Novotny, "Microsensors for Contactless Angle Sensing," Sep. 23, 2014 http://www.ac.tut.fi/aci/courses/ACI-51106/pdf/Angle/AngleSensing.pdf, p. 1-9.

This End Up: Using Device Orientation, by Pete LePage, Apr. 29, 2011, http://www.html5rocks.com/en/tutorials/device/orientation/, p. 1-17.

Sony Tablet p—Dual screen for maximum mobility, Get more done on the go with two 13.9 cm (5.5") touch screens, 1GB RAM, MicroSD card storage, ultra light and compact design, Wi-Fi and 3G, http://www.sony.co.uk/product/sony-tablet-p/tab/overview, p. 1-12.

NEC Unveils Bizarre Dual-Screen Medias W N-05E CNET Editor's Take, Feb. 26, 2013, http://www.cnet.com/products/nec-medias-w-n-05e/, p. 1-8.

Position Sensors; Android Developers, Sep. 6, 2013; http://developer.android.com/guide/topics/sensors/sensors_position.html, p. 1-5.

Passive and Active Cooling Modes; Oct. 12, 2013, http://msdn.microsoft.com/en-us/library/windows/hardware/hh698271 (v=vs.85).aspx, p. 1-2.

"Procedure for Developing Intuitive and Ergonomic Gesture Interfaces for Man-Machine Interaction," Nielsen, Aalborg University, Laboratory of Computer Vision and Media Technology, Denmark, Technical Report CVMT 03-01, ISSN 1601-3646, CVMT, Aalborg University, Mar. 2003, pp. 1-12.

* cited by examiner

PROTECTIVE COVER AND DISPLAY POSITION DETECTION FOR A FLEXIBLE DISPLAY SCREEN

FIELD OF THE DISCLOSURE

The present disclosure generally relates to a protective cover and display state detection for a flexible display screen.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display platforms with one or more display screens to output images. The information handling system can also include hinges to allow the display platforms can transition to different positions.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Additionally, traditional information handling system input devices such as keyboards and mouse systems are giving way to visual input interfaces such as touchscreens, hover detection, and motion sensing technologies. In many instances, it is substantially beneficial to implement a system with multiple display platforms having one or more display screens configurable in many orientations to interact with an information handling system.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Multiple display platform information handling systems may be configurable in a plurality of orientations for utilization of and interaction with the information handling system. Hereinafter, the terms dual display screen information handling system or dual display information handling systems, or dual display platform information handling system each may refer to devices with a single display screen such as a flexible display that is layered over or mounted on all or part of two or more display platforms, or each may refer to devices with two or more fully integrated display screens, or each may refer to devices with a plurality of separate display screens that are modularly connectable to the information handling system or to one another. The terms screen or display screen may also refer to a portion of a single display screen, such as a flexible display screen, with a plurality of portions or to an individual display screen. Screens or display screens may herein refer to portions of a display screen and may be mounted on or integrated into one or more display platforms. It is understood that while two display platforms are disclosed in several embodiments herein, embodiments including a plurality of display platforms including three or more display platforms in hinged relationship is also contemplated for the systems and methods disclosed herein. One of ordinary skill would understand implementing the systems and method embodiments discussed herein for these additional embodiments.

An information handling system can include two hinged display platforms, a flexible display screen, a coating over the flexible display screen, and a cover on a back surface of the information handling system. The display screen may be mounted over or into and supported by the display platforms and. The mounted flexible display screen 106 may be movably mounted to display platforms. In other words, mounted flexible display screen may be able to slide or otherwise move with respect to one or both of the display platforms.

The flexible display screen may be completely covered by the coating, which in turn may have a hardness level greater than a hardness level of the flexible display screen. Thus, the coating can protect the flexible display screen from being scratched or otherwise worn during use and movement of the information handling system. In an embodiment, the display platforms are connected via the hinge structure along one side of each display platform. The hinge can enable the display platforms to rotate with respect to each other, such that the display platforms can be positioned with different angles between them. As the display platforms rotate from the open position to another position, the coating can be stressed in the area surrounding the hinge.

In an embodiment, the coating includes a coating flexing region located within a portion of the coating that is substantially aligned with the hinge. The coating flexing region can be a flexible material to enable the coating to bend within the coating flexing region without breaking, cracking, or the like. In an embodiment, the flexing region can include sub-regions, which can alternate in hardness level. The individual hardness levels of the sub-regions can be averaged together to create an overall hardness level for the entire flexing region. A hardness level of the coating flexing region can be higher than the hardness level of the flexible display screen, but can be lower than the hardness level of the remaining regions of the coating.

The cover can be in physical communication with a back surface of each of the display platforms, and the cover can include a cover flexing region and a cover rigid region. In this embodiment, the cover flexing region is located substantially in the middle of the cover rigid region and aligned with the hinge. In an embodiment, the cover flexing region of the cover includes sub-regions, which can alternate in hardness level. In this embodiment, the individual hardness levels of the sub-regions can be averaged together to create an overall hardness level for the entire cover flexing region. The cover flexing region can have a hardness level that is less than a hardness level of the cover rigid region, and that is low enough to be bent without breaking. Thus, when the display platforms are rotated, the cover can bend at the cover flexing region without damaging the cover.

The information handling system can also include orientation sensors that can be located within the cover. In one embodiment, the orientation sensors can be located along the cover flexing region of the cover. In different embodiments, the orientation sensors can be embedded within the material of the cover, can be mounted in between the cover and the display platforms, or any combination thereof. The orientation sensors can detect different amounts of pressure and/or strain exerted on the cover in response to the orientation or position of the display platforms. The orientation sensors can provide signals to a basic input/output system (BIOS) in the central processing unit (CPU) located within one of the display platforms, and the signals can be utilized to determine an angle between the display platforms. The determined angle between the display platforms can then be used to determine a position of the display platforms, and to select an application to be executed in the information handling system, to configure a layout of the display screen, to select a power management level, or any combination thereof.

Figure 1:
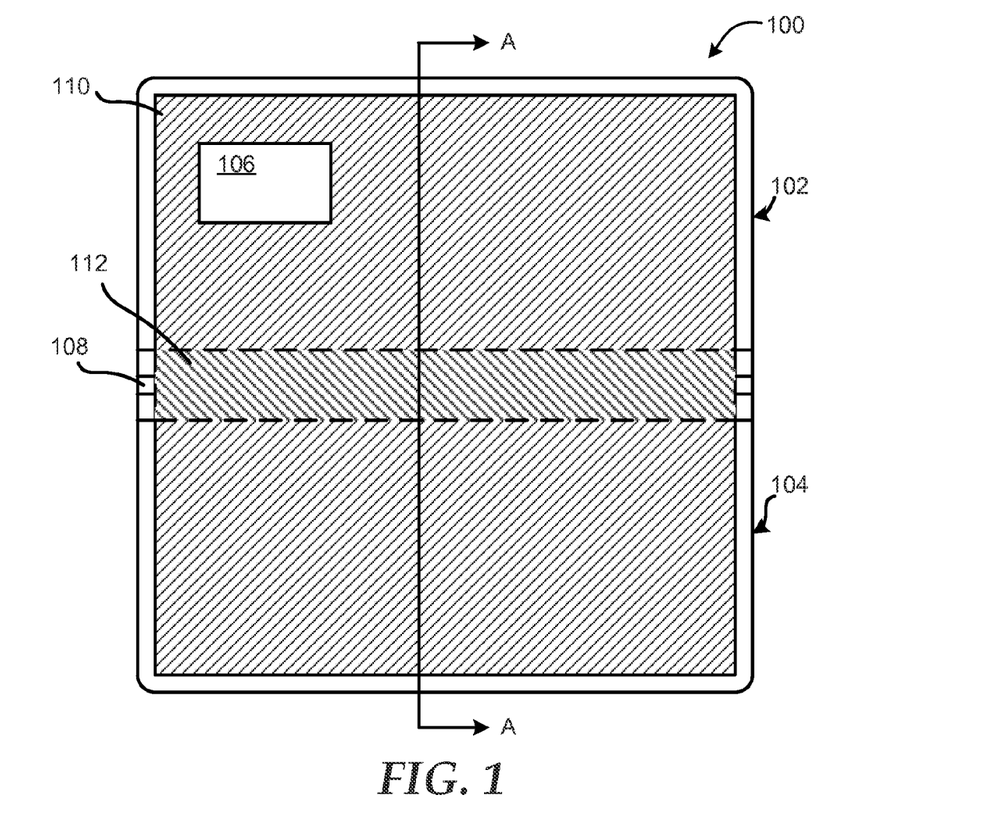
FIG. 1 is a diagram of a information handling system in an open position according to an embodiment of the present disclosure.

FIG. 1 shows an embodiment of a dual display platform information handling system 100 with two hinged display platforms according to an embodiment of the present disclosure. The information handling system 100 includes display platforms 102 and 104, a flexible display screen 106, a hinge 108, and a coating 110. In an embodiment, display platforms 102 and 104 may include housings to contain underlying electronics and power components of the information handling system 100. Accordingly for the described embodiment, housings may be used interchangeably with display platforms. In an embodiment, the flexible display screen 106, such as a flexible active-matrix organic LED (AMOLED) display, may be mounted over or into display platforms 102 and 104. In the illustrated embodiment, the display screen 106 may be mounted to and supported by the display platforms 102 and 104. The mounted flexible display screen 106 may be movably mounted to display platforms 102 and 104. In other words, mounted flexible display screen 106 may be able to slide or otherwise move with respect to one or both of the display platforms 102 and 104.

As illustrated in this embodiment, display platforms 102 and 104 are connected via the hinge structure 108 along one side of each display platform. Hinge 108 may run most of the entire length of one side of each of the display platforms 102 and 104. Alternatively, one or more hinges may be connected only at portions of the edges of the two display platforms 102 and 104. For example, one hinge point connection may be sufficient at only one spot along the edge of the two display platforms 102 and 104. In another embodiment, two connection points may be sufficient. In this example, the two connection points may be near the ends of the hinged edges of the display platforms 102 and 104. The hinge 108 may include power and communication connections allowing information and power to be transferred between display platforms 102 and 104, and the flexible display screen 106. This will provide flexibility on where to locate various processors, power sources, connections, and sensors as between the display platforms 102 and 104.

For illustrative purposes only, the display screen 106 is shown through a cutout in the coating 110. However, the flexible display screen 106 is completely covered by the coating 110. In an embodiment, the coating 110 is a plastic surface that preferable has a hardness level greater than a hardness level of the flexible display screen 106, and that can protect the flexible display screen from being scratched or otherwise worn during use and movement of the information handling system 100.

The hinge 108 can enable the display platforms 102 and 104 to rotate with respect to each other, such that the display platforms can be positioned with different angles between them. As illustrated in FIG. 1, the information handling system 100 is in a landscape page orientation, or open position, and the display platforms 102 and 104 are substantially inline with each other. As the display platforms 102 and 104 rotate from the open position to another position, such as a closed position, a laptop position, a reader position, or the like, the coating 110 can be stressed in the area surrounding the hinge 108.

In an embodiment, the coating 110 includes a coating flexing region 112 located within a portion of the coating that is substantially aligned with the hinge 108. The coating 110 can be a flexible material, such as an elastomeric resin or similar material. In an embodiment, the coating flexing region 112 can be thinner than remaining portions of the coating 110 to enable the coating 110 to bend within the flexing region 112 without breaking, cracking, or the like. In this embodiment, a hardness level of the coating flexing region 112 can be lower than the hardness level of the remaining regions of the coating 110 in response to the coating flexing region being thinner than the other portions of the coating. In another embodiment, the coating flexing region 112 can be made of a different material than the remaining portions of the coating 110 and thereby the coating flexing region can have a lower hardness level than the other portions of the coating. The coating flexing region 112 the remaining portions of the coating 110 will be shown in greater detail in FIG. 2.

Figure 2:
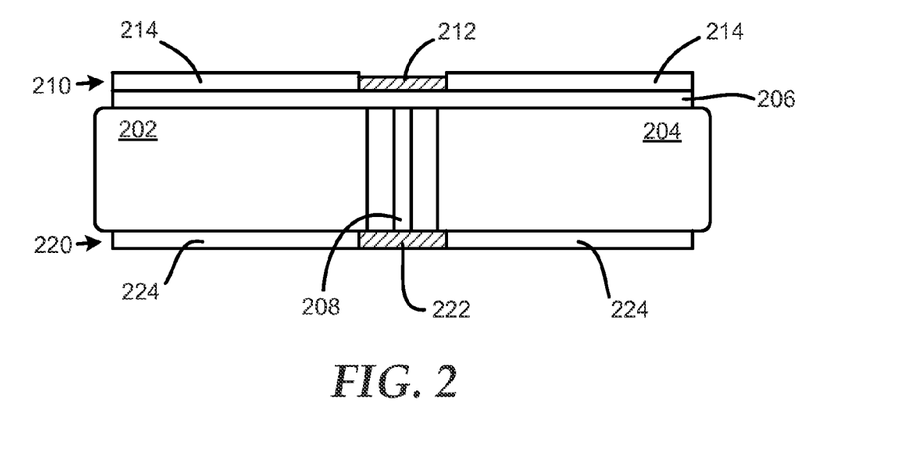
FIG. 2 is a diagram of a cross section of the information handling system according to an embodiment of the present disclosure.

FIG. 2 illustrates a cross section of the information handling system taken along the line A-A of FIG. 1 according to an embodiment of the present disclosure. The information handling system 200 includes first and second display platforms 202 and 204 connected together via a hinge 208. The information handling system 200 also includes a flexible display screen 206, a coating 210, and a cover 220. In the illustrated embodiment, the coating 210 covers the flexible display screen 206, and includes a coating flexing region 212 and a hard-coated region 214. In this embodiment, the coating flexing region 212 is located substantially in the middle of the hard-coated region 214 and aligned with the hinge 208. The flexing region 212 and the hard-coated region 214 have hardness levels that are greater than a hardness level of the flexible display screen 206. Thus, the flexing region 212 and the hard-coated region 214 can protect the display screen 206 from scratches or other damage that may result from the use of the flexible display screen as a touch sensitive screen. The coating flexing region 212 can have a hardness level that is less than a hardness level of the hard-coated region 214. The hardness level of the coating flexing region 212 can be low enough that when the display platforms 202 and 204 are rotated, the coating 210 can bend at the coating flexing region 212 without damaging the coating.

In an embodiment, the coating flexing region 212 can have a lower hardness level as a result of the coating flexing region being thinner than the hard-coated region 214. In this embodiment, a first coating layer can be applied to the flexible display screen 206, then a mask can be applied on top of the first coating layer and the mask can be aligned with the hinge 208. After the mask is applied to the first coating layer, a second coating layer is applied to the first coating layer in the hard-coated region 214. However, the mask prevents the second coating layer from being applied in the coating flexing region 212. The mask can then be removed, and the coating flexing region 212 can have a hardness level that is less than the hardness level of the hard-coating region 214. Only two coating layers have been described, additional coating layers can be added to vary the hardness levels in the different regions of the coating 210 without varying from the scope of this disclosure.

In another embodiment, the hardness level of the coating flexing region 212 can vary from the hardness level of the hard-coated region 214 in response to the coating region being made from a different material than the hard-coated region. In this embodiment, the material composition of the coating flexing region 212 can be a more flexible material than the material composition of the hard-coated region 214. Thus, the coating flexing region 212 can have a hardness level that is less than a hardness level of the hard-coated region 214, such that when the display platforms 202 and 204 are rotated, the coating 210 can bend at the coating flexing region 212 without damaging the coating.

The cover 220 is in physical communication with a back surface of the display platforms 202 and 204, and the cover 220 includes a cover flexing region 222 and a cover rigid region 224. In this embodiment, the cover flexing region 222 is located substantially in the middle of the cover rigid region 224 and aligned with the hinge 208. In an embodiment, the cover 220 can be a lattice of carbon fiber, polymer fiber, carbon fiber infused with a polymer, or a similar material. The cover flexing region 222 can have a hardness level that is less than a hardness level of the cover rigid region 224, and that is low enough to be bent without breaking. Thus, when the display platforms 202 and 204 are rotated, the cover 220 can bend at the cover flexing region 222 without damaging the cover. The hardness level of the cover flexing region 222 can be varied from the cover rigid region 224 in substantially the same manner as described above for the coating flexing region 212. For example, the cover flexing region 222 can vary in thickness from the cover rigid region 224, or the cover flexing region can be made from a different material than the cover rigid region. In an embodiment, the hardness level of the cover 220 also can be varied by changing the amount of polymer fiber infused within the carbon fiber. For example, the more polymer fiber infused within the carbon the lower the hardness level of cover 220. In another embodiment, the cover 220 can be a single region, such that the entire portion of the cover can be made on the same material, and the entire cover can flex and bend the same amount.

In an embodiment, the material composition of the coating flexing region 212 can be different from the material composite hard-coated region 214, such that the hardness level of the coating flexing region can be different from the hardness level of the hard-coated region. In this embodiment, the coating flexing region 212 of the coating 210 can be less rigid than the hard-coated region 214 of the coating. Similarly, the cover flexing region 222 can be less rigid than the cover rigid region 224. In an embodiment, the coating flexible region 214 can be a deposit of glass, such as gorilla glass, sodalime glass, or the like, on the flexible display screen 206, and the hard-coated region 214 can be a deposit of aluminum oxynitride or sapphire, both of which have a higher hardness level than glass. For example, the Knoop Hardness of Sodalime glass can be 500 kg/mm$^2$, of Gorilla glass can be 1000 kg/mm$^2$, of Aluminum oxyniritide can be 1800 kg/mm$^2$, and of sapphire can be 2100 kg/mm$^2$. In an embodiment, after depositing the different materials on the flexible display screen 206, the coating can be heated in particular locations to crystallize the materials and cause selective hardness levels. Thus, the material composition of the coating and heating of the material can vary the hardness levels in the coating 210. A similar process can be applied to the cover 220 to vary the hardness levels of the cover flexing region 222 and the cover rigid region 224.

Figure 3:
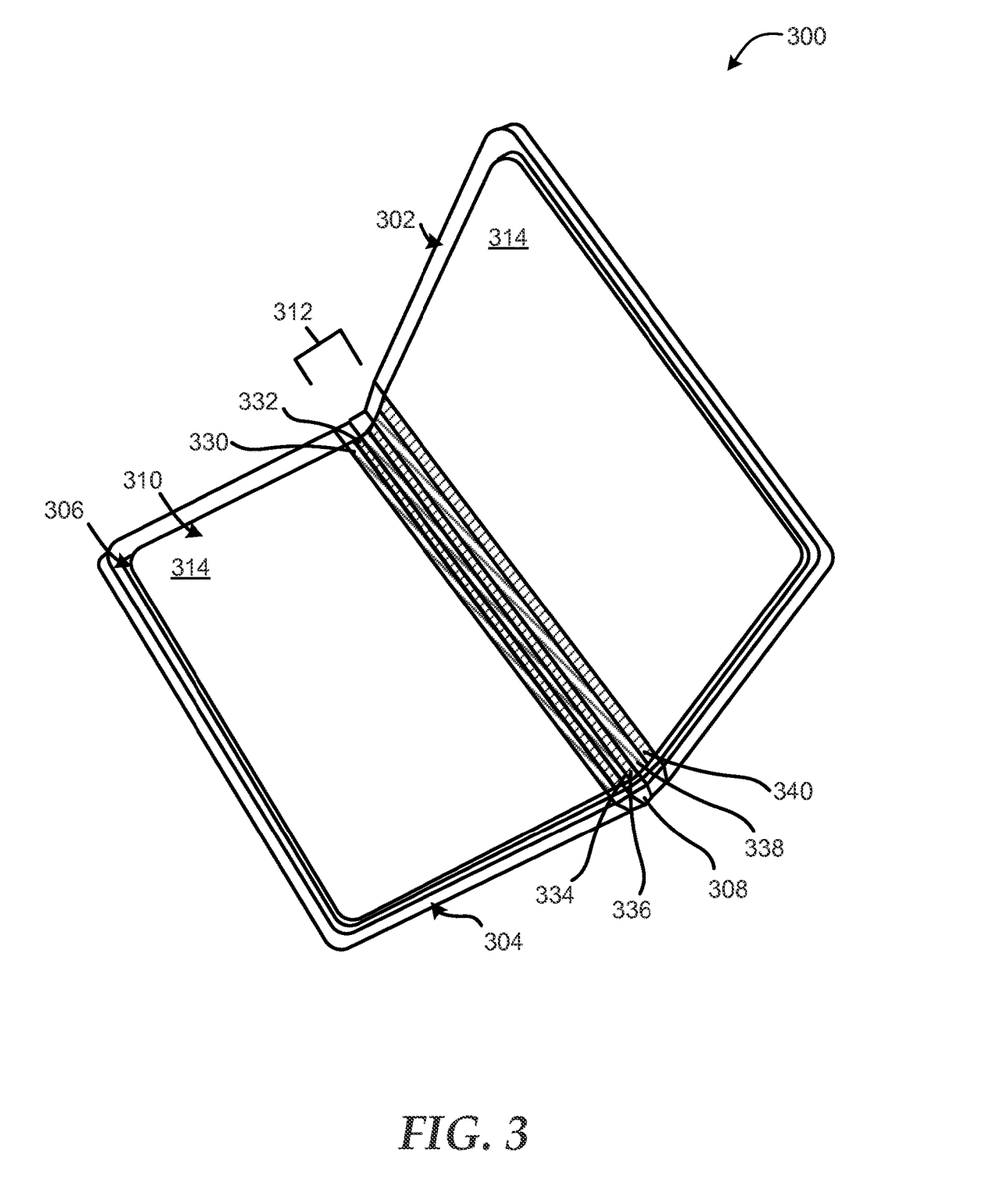
FIG. 3 is a diagram of a perspective of the information handling system in a laptop position according to an embodiment of the present disclosure.

FIG. 3 is a diagram of a perspective of the information handling system in a laptop position according to an embodiment of the present disclosure. The information handling system 300 includes first and second display platforms 302 and 304 connected together via a hinge 308. The information handling system 300 also includes a flexible display screen 306 and a coating 310. In the illustrated embodiment, the coating 310 covers the flexible display screen 306, and the coating includes a flexing region 312 and a hard-coated region 314. The flexing region 312 can be located substantially in the middle of the hard-coated region 314 and aligned with the hinge 308.

In this embodiment, the flexing region 212 includes sub-regions 330, 332, 334, 336, 338, and 340 (330-340), which can alternate in hardness level. For example, sub-regions 330, 334, and 338 have a hardness level that is less than the hardness level of the sub-regions 332, 336, and 340. Thus, sub-regions 330, 334, and 338 can be the first sub-regions to bend when the display platforms 302 and 304 rotate from one position to another. In an embodiment, the hardness levels of the sub-regions 330-340 can be varied from one sub-region to the next by varying the thickness of the sub-regions via a mask or by varying the material composite of sub-regions as described above with respect to FIG. 2. In different embodiments, the width of the sub-regions 330-340 can vary. In an embodiment, the width of each sub-region 330-340 can be small enough and the number of sub-regions can be large enough that transitions between sub-regions are not detectable by a human finger.

The individual hardness levels of the sub-regions 330-340 can be averaged together to create an overall hardness level for the entire flexing region 312. In an embodiment, the flexing region 312 has an overall hardness level that is greater than a hardness level of the flexible display screen 308, but that is less than a hardness level of the hard-coated region 314. Thus, the flexing region 312 and the hard-coated region 314 can protect the display screen 306, and the coating 310 can bend at the sub-regions 330-340 of the flexing region 312 without damaging the coating when the display platforms 302 and 304 are rotated.

Figure 4:
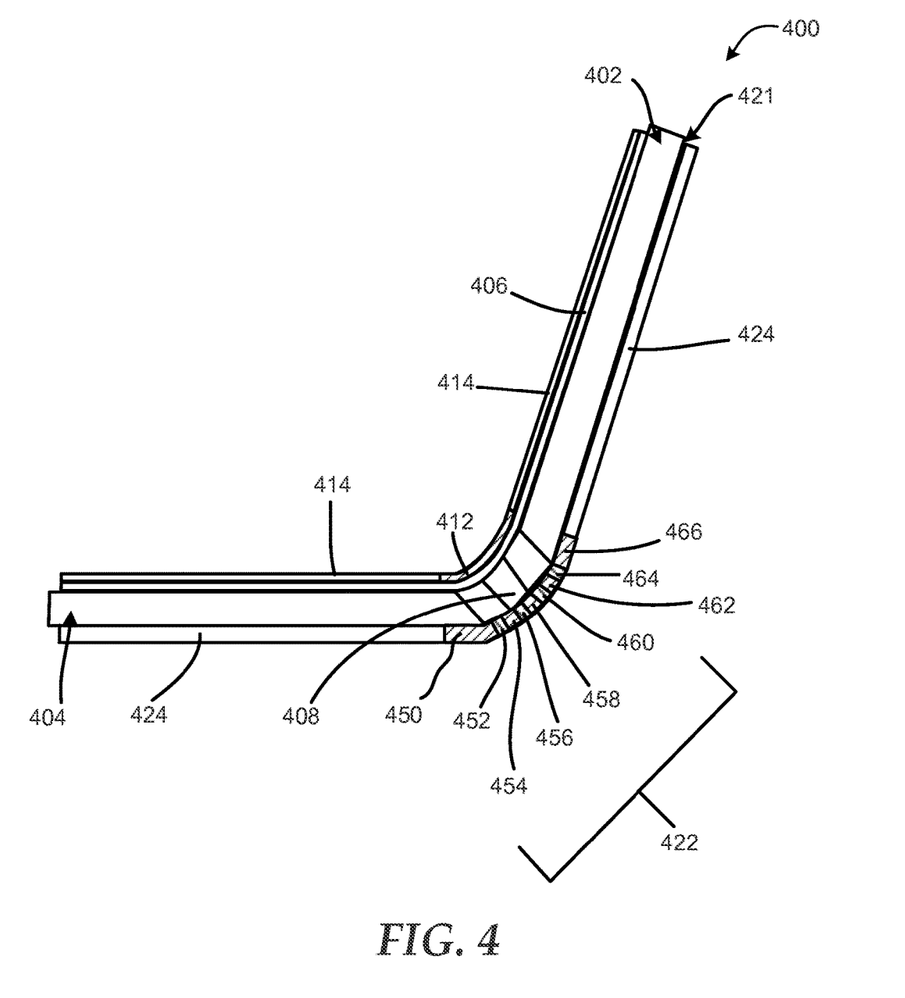
FIG. 4 is a diagram of a side view of the information handling system in the laptop position according to an embodiment of the present disclosure.

FIG. 4 is a diagram of a side view of the information handling system in the laptop position according to an embodiment of the present disclosure. The information handling system 400 includes first and second display platforms 402 and 404 connected together via a hinge 408. The information handling system 400 also includes a flexible display screen 406, a coating 410, and a cover 420. In the illustrated embodiment, the coating 410 covers the flexible display screen 406, and the coating includes a flexing region 412 and a hard-coated region 414. In this embodiment, the flexing region 412 is located substantially in the middle of the hard-coated region 414 and aligned with the hinge 408.

In an embodiment, the cover 420 protects a back surface 421 of the display platforms 402 and 404, and the cover includes a flexing region 422 and a cover rigid region 424. The flexing region 422 can be located substantially in the middle of the cover rigid region 424 and aligned with the hinge 408. In this embodiment, the flexing region 422 includes sub-regions 450, 452, 454, 456, 458, 460, 462, 464, and 466 (450-466), which can alternate in hardness level. For example, sub-regions 450, 454, 458, 462, and 466 have a hardness level that is less than the hardness level of the sub-regions 452, 456, 460, and 464. The individual hardness levels of the sub-regions 450-466 can be averaged together to create an overall hardness level for the entire flexing region 422. In an embodiment, the flexing region 422 has an overall hardness level that is less than a hardness level of the cover rigid region 424. When the display platforms 402 and 404 are rotated between different positions or orientations, the cover 420 can bend at the sub-regions 450-466, and particularly at the sub-regions 450, 454, 458, 462, and 466, of the flexing region 422 without damaging the cover.

Figure 5:
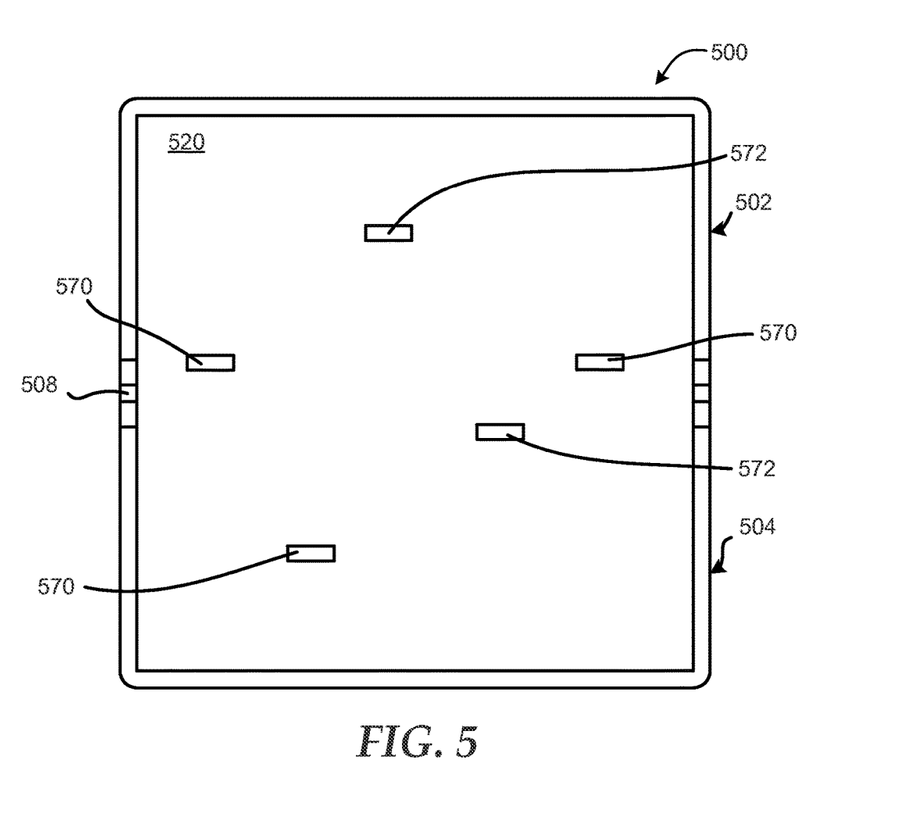
FIG. 5 is a diagram of the information handling system in an open position viewed from a back surface according to an embodiment of the present disclosure.

FIG. 5 is a diagram of the information handling system in an open position viewed from a back surface of display platforms according to an embodiment of the present disclosure. In the illustrated embodiment, the information handling system 500 includes display platforms 502 and 504, a hinge 508, a cover 520, and orientation sensors 570 and 572. In an embodiment, the cover 520 covers a back surface of the display platforms 502 and 520. In an embodiment, the orientation sensors can include any combination of pressure sensors 570, strain sensors 572, or similar sensors. In different embodiments, the orientation sensors 570 and 572 can be embedded within the material of the cover 520, can be mounted in between the cover and the display platforms 502 and 504, or any combination thereof. For example, the orientation sensors 570 and 572 can be integrated within a lattice of the material, such as carbon fiber, carbon fiber infused with a polymer, or the like, of the cover 520.

The orientation sensors 570 and 572 can sense an amount of strain or pressure exerted on the lattice material of the cover 520 as the display platforms 502 and 504 change orientations. The orientation sensors 570 and 572 can then provide signals to a basic input/output system (BIOS) in the central processing unit (CPU) located within one of the display platforms 502 and 504, and the signals can be utilized to determine an angle between the display platforms as discussed below with respect to FIGS. 6-8 below.

In another embodiment, the cover includes a cover flexing region and a cover rigid region 524. In this embodiment, the cover flexing region is located substantially in the middle of the cover rigid region and aligned with the hinge 508. In this embodiment, the orientation sensors 570 and 572 can be located along the cover flexing region of the cover. The orientation sensors 570 and 572 can located only in the flexing region, or additional orientation sensors can be located within the cover rigid region. In this embodiment, the orientation sensors located along the cover rigid region can provide a baseline for the pressure and/or strain exerted between the cover 520 and the display platforms 502 and 504.

Figure 6:
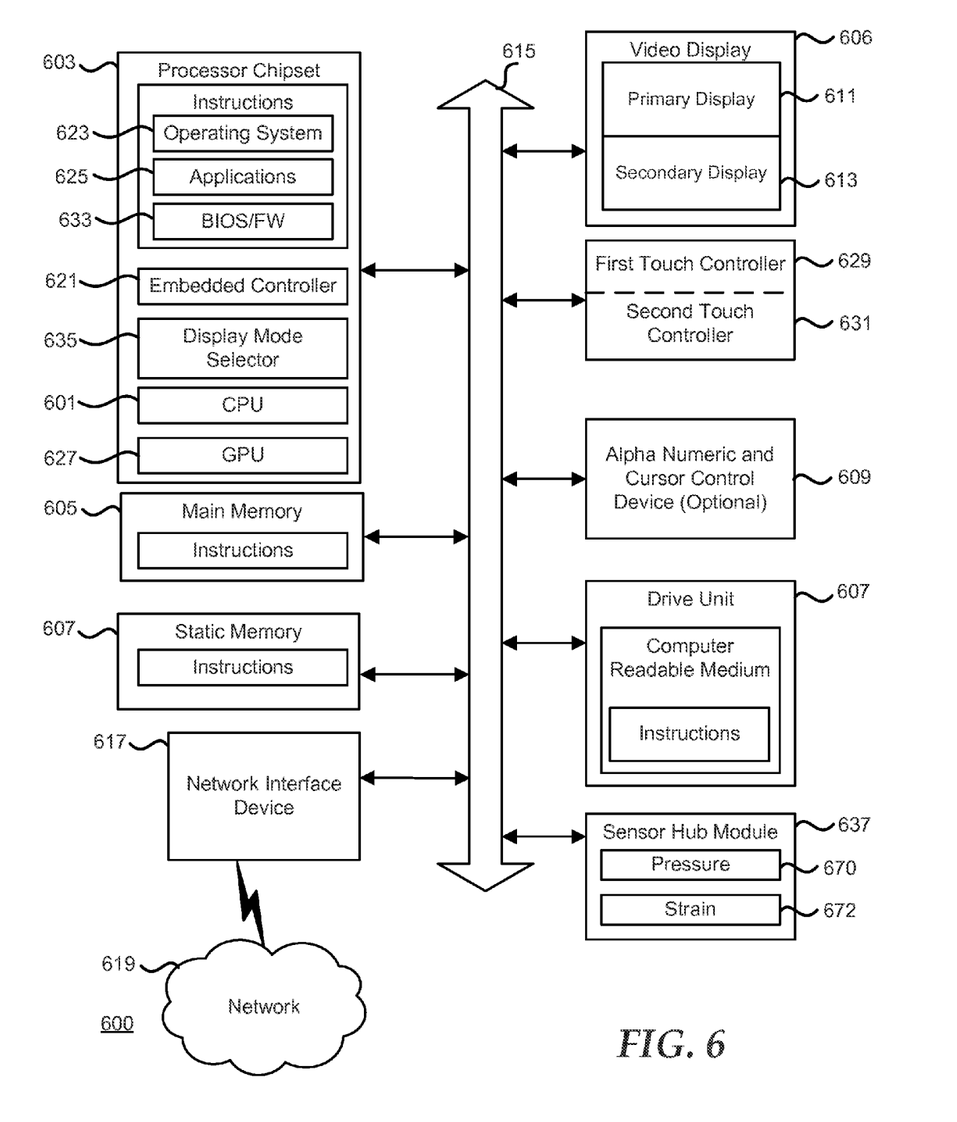
FIG. 6 is a hardware block diagram illustrating the information handling system according to an embodiment of the present disclosure.

FIG. 6 is a hardware block diagram illustrating conventional information handling systems components according to an embodiment of the present disclosure. The information handling system 600 may include memory, one or more processing resources such as a central processing unit (CPU) 601 and related chipset(s) 603 or hardware or software control logic. Additional components of system 600 may include main memory 605, one or more storage devices such as static memory or disk drives 607, an optional external input device 609 such as a keyboard, and a cursor control device such as a mouse, and a flexible display screen 606 including one or more displays 611 and 613. The information handling system 600 may also include one or more buses 615 operable to transmit communications between the various hardware components.

More specifically, system 600 represents a mobile user/client device, such as a dual display platform mobile tablet computer. System 600 has a network interface device 617, such as for a wireless cellular or mobile networks (CDMA, TDMA, etc.), WIFI, WLAN, LAN, or similar network connection, enabling a user to communicate via a wired or wireless communications network 619, such as the Internet. System 600 may be configured with conventional web browser software. The web browser, may include for example Microsoft Corporation's Internet Explorer web browser software, Firefox or similar such browsers to allow the user to interact with websites via the wireless communications network 619.

System 600 may include several sets of instructions to be run by CPU 601 and any embedded controllers 621 on system 600. One such set of instructions includes an operating system 623 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 625 may be run by system 600. These software applications 625 may enable multiple uses of the dual display platform information handling system as set forth in more detail below.

System 600 includes flexible a first or primary display 611 and a second or secondary display 613. Each display of the flexible display screen 606 has a display driver operated by one or more graphics processing units (GPUs) 627 such as those that are part of the chipset 603. Each screen also has an associated touch controller 629, 631 to accept touch input on the touch interface of each display on the flexible display screen 606. It is contemplated that one touch controller may accept touch input from displays 611 and 613, or as shown in the current embodiment, two touch controllers 629 and 631 may operate each display respectively. In the current embodiment, the first touch controller 629 is associated with the primary display 611. The second touch controller 631 is associated with the secondary display 613.

The primary display 611 and the secondary display 613 may also be controlled by the embedded controller 621 of chipset 603. For example, the power to the flexible display screen 606 including the primary display 611 and the secondary display 613 is controlled by an embedded controller 621 in the processor chipset(s) which manages a battery management unit (BMU) as part of a power management unit (PMU) in the BIOS/firmware 633 of the main CPU processor chipset(s). These controls form a part of the power operating system. The PMU (and BMU) control power provision to the display screens and other components of the dual display information handling system.

A display mode selector 635, in connection with a power management application as described in more detail below, determines what power savings measure to deploy via the embedded controller 621 based upon orientation of the display platforms as well as the software applications 625 currently running and active. Determining which applications 625 are running determines a working software application context. Alternatively, the power mode selector may operate on a controller 621 separate from the main CPU chipset(s) 603. Additionally, the power management application may receive state of usage activity input from device state sensors.

System 600 of the current embodiment has a system sensor module 637. Various orientation sensors are included in this module to assist with determining the relative orientation of the display platforms of system 600. Subcategories of orientation sensors include pressure sensors 670, and strain sensors 672. Sensor system module 637 is a sensor hub, or an accumulator device, that collects raw data from connected orientation sensors, and organizes and processes data received from the connected sensors. The sensor hub 637 also processes raw sensor data to groom the raw sensor data into a useable form of positional analysis for the dual display information handling system 600 and its display platforms. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub 637 may communicate with the sensors 670 and 672 and the main CPU processor chipset 603 via a bus connection 615 such as an Inter-Integrated Circuit (I2C) bus or other suitable type of multi-master bus connection.

The sensor data from the sensor hub 637 is then further groomed by the power management application and the display mode selector 635. A relative orientation of the dual display information handling system 600 in space, the orientation and angle of the two display platforms with respect to one another, consideration of state of usage activity data, and working software application context are determined by the power management application and the display mode selector 635 at CPU 601 and embedded controller 621. This relative orientation data of the system 600, the state of usage activity data, and the working software application context are used by a power management application and display mode selector 635 to determine power savings measures to be taken.

Figure 7:
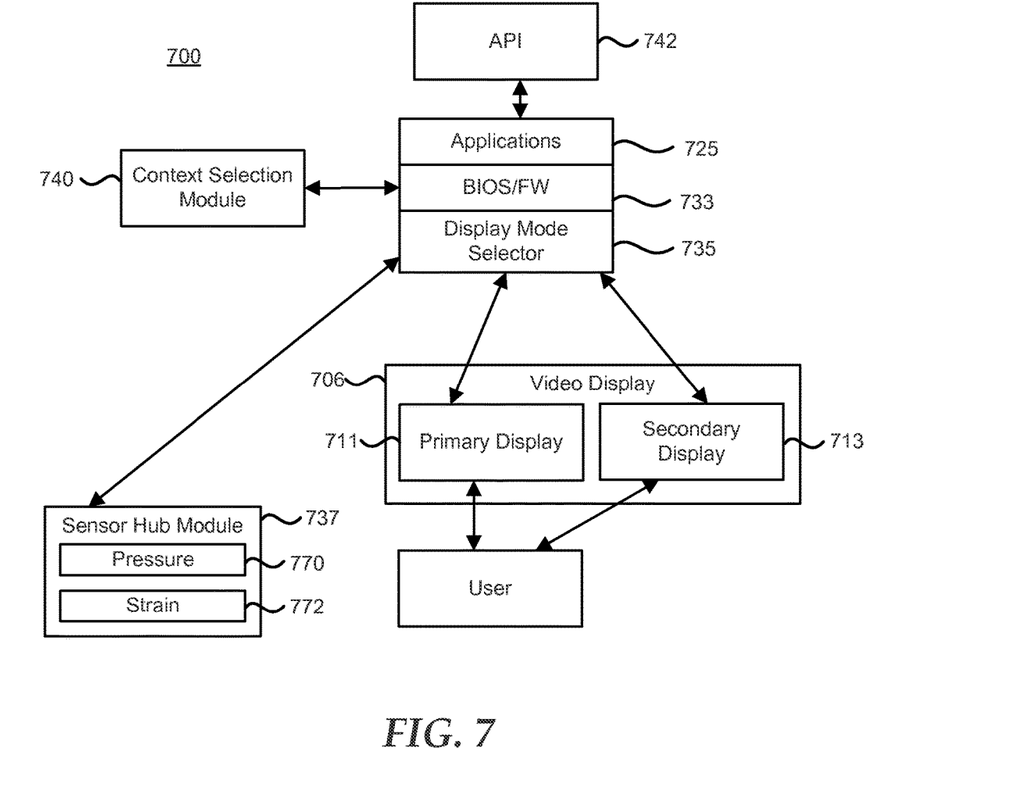
FIG. 7 is a hardware block diagram illustrating a portion of the information handling system according to an embodiment of the present disclosure.

FIG. 7 illustrates a system block diagram of a portion of a dual display power management system 700 including sensor hub module 737 and context selection module 740 according to an embodiment of the present disclosure. Also shown are the primary display 711 and the secondary display 713 of the flexible display screen 706, which in turn is integrated into the dual display information handling system. The dual display power management system 700 includes a power management application 725, BIOS/firmware 733, and display mode selector 735 that comprises a set of instructions run on CPU 601 or embedded controller 621 in the chipset(s) 603 shown in FIG. 6. The power management application 725, BIOS/firmware 733, and display mode selector 735 interface with the application programming interface (API) 742 found in the information handling system software to coordinate various software applications. The API 742 may coordinate the power management application 725, BIOS/firmware 733, and display mode selector 735, sensor hub input data, other independent sensor input types such as camera or touch hover detection applications, display device drivers and PMU/BMU applications controlling power allocation via a power operating system (Power OS).

The power management application 725, the BIOS 733, and display mode selector 735 receive data from the sensor system module 737 that includes an accumulator sensor hub that gathers sets of data from some or all of the orientation sensors shown. The orientation sensor types include pressure sensors 770 and strain sensors 772. Some orientation sensors are connected through the sensor hub or accumulator device and system. The pressure sensors 770 can detect different amount of pressure based on the position of the display platforms 502 and 504 of FIG. 5. For example, as the display platforms rotate from the open position, shown in FIG. 1, to the laptop position of FIG. 2, an amount of pressure measured by the pressure sensors 770 will increase in response to an increase of force between the hinge 508 and the cover 520. In this embodiment, the amount of pressure detected by the pressure sensors 770 can increase from a minimum level when the display platforms 502 and 504 are in the open position to a maximum level when the display platforms are in the closed position.

The pressure sensors 770 can provide signals indicating the detected pressure level to one of or to each of the power management application 725, the BIOS 733, and display mode selector 735. The CPU 601 can then determine an angle between the display platforms 502 and 504 based on the signal received from the pressure sensors 770, and can utilize the angle of the display platforms to determine an application to be executed, a layout of the primary display 711 and the secondary displays 713 on the flexible display screen 706, power management levels, or the like. For example, if the angle between the display platforms 502 and 504, of FIG. 5, is determined to be substantially equal to that of a predetermined angle for the laptop position, the primary display 711 (video output of an application) can be assigned on the portion of the display screen 706 on the display platform 502, and the secondary display 713 (virtual keyboard) can be assigned on the portion of the display screen on the display platform 504. The calculation of the angle between the display platforms 502 and 504 can be perform substantially similar to that described in U.S. patent application Ser. No. 14/101,612, entitled "System and Method for Positioning an Application Window Based on Usage Context for Dual Screen Display Device," filed Dec. 10, 2013, the disclosure of which is hereby expressly incorporated by reference in its entirety and assigned to the assignee hereof; U.S. patent application Ser. No. 14/066,484, entitled "System and Method for Display Power Management for Dual Screen Display Platform," filed Oct. 29, 2013, the disclosure of which is hereby expressly incorporated by reference in its entirety and assigned to the assignee hereof; and U.S. application Ser. No. 14/078,775, entitled "Dynamic Hover Sensitivity and Gesture Adaptation in a Dual Display System," filed Nov. 13, 2013, the disclosure of which is hereby expressly incorporated by reference in its entirety and assigned to the assignee hereof.

The strain sensors 772 can detect different amount of strain within the cover 520 based on the position of the display platforms 502 and 504. For example, as the display platforms 502 and 504 rotate from the open position to the laptop position, an amount of strain place on the cover 520 will increase. In this embodiment, the amount of strain detected by the strain sensors 772 can increase from a minimum level when the display platforms 502 and 504 are in the open position to a maximum level when the display platforms are in the closed position.

The strain sensors 772 can provide signals indicating the detected strain level to one of or to each of the power management application 725, the BIOS 733, and display mode selector 735. The CPU 601 can then determine an angle between the display platforms 502 and 504 based on the signal received from the strain sensors 772, and can utilize the angle of the display platforms to determine an application to be executed, a layout of the primary display 611 and the secondary displays 613 on the flexible display screen 706, power management levels, or the like.

Figure 8:
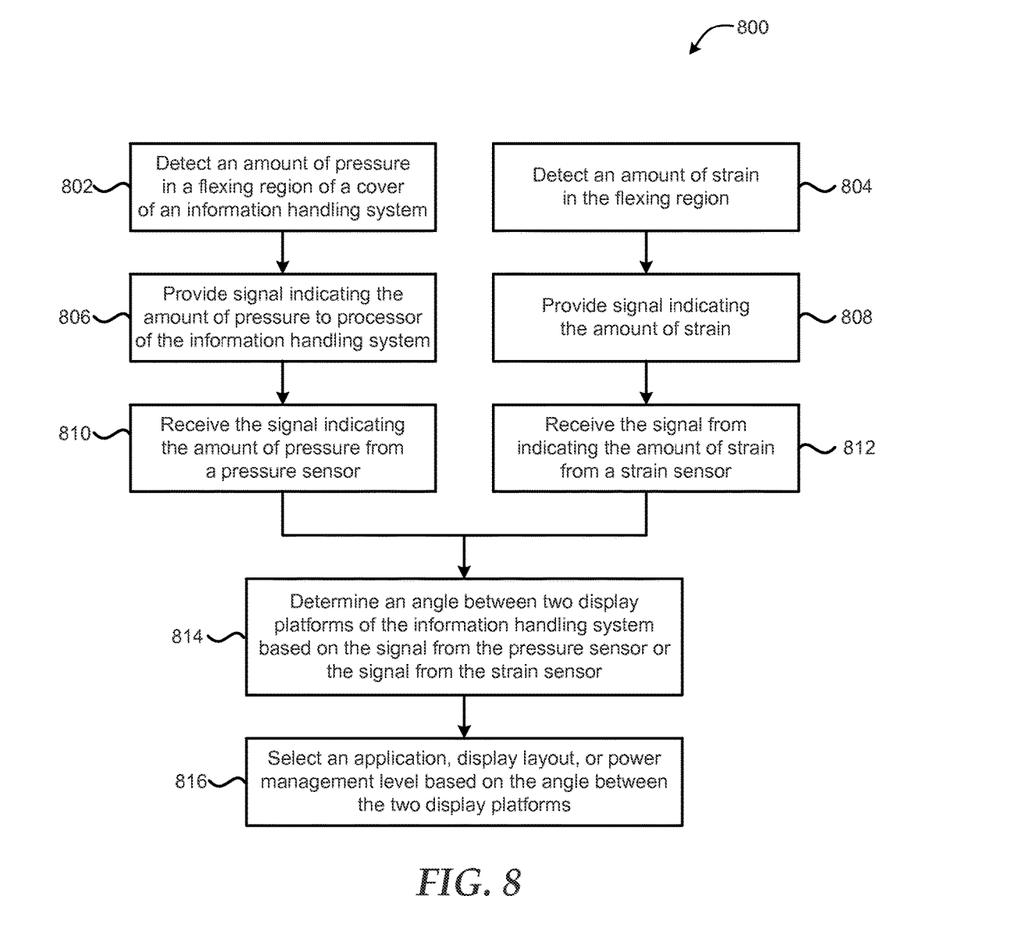
FIG. 8 is a flow diagram of a method for determining an angle between first and second display platforms of the information handling system according to an embodiment of the present disclosure.

FIG. 8 is a flow diagram of a method 800 for determining an angle between first and second display platforms of the information handling system according to an embodiment of the present disclosure. At block 802, an amount of pressure in a flexing region of a cover on a back surface of an information handling system is detected. In an embodiment, the amount of pressure can be detected by a pressure sensor located in between the flexing region and a hinge of the information handling system. The flow continues at block 804, and an amount of strain in the flexing region is detected. In an embodiment, the amount of strain can be detected by a strain sensor located within the flexing region.

At block 806, a signal indicating the amount of pressure is provided to a processor of the information handling system. A signal indicating the amount of strain in the flexing region is provided to the processor at block 808. At block 810, the signal indicating the amount of pressure is received from the pressure sensor. The signal indicating the amount of strain is received from the strain sensor at block 812. At block 814, an angle between two display platforms is determined based on the signal indicating the amount of pressure and/or the signal indicating the amount of strain. In an embodiment, the amount of strain detected and/or the amount pressure detected can increase as the angle between the two display platforms increase. An application, display layout, or power management level is selected based on the angle at block 816.

In an embodiment, the angle between the display platforms can indicate an orientation or position of the display platforms, such as an open position, a laptop position, a reader position, a closed position, or the like, and different applications, display layouts, and power management levels can be initiated in response to the position of the display platforms. For example, if the detected angle indicates that the display platforms are in the reader position, a reader application can be launched and both the primary and secondary displays can be utilized as an output for the reader application.

Figure 9:
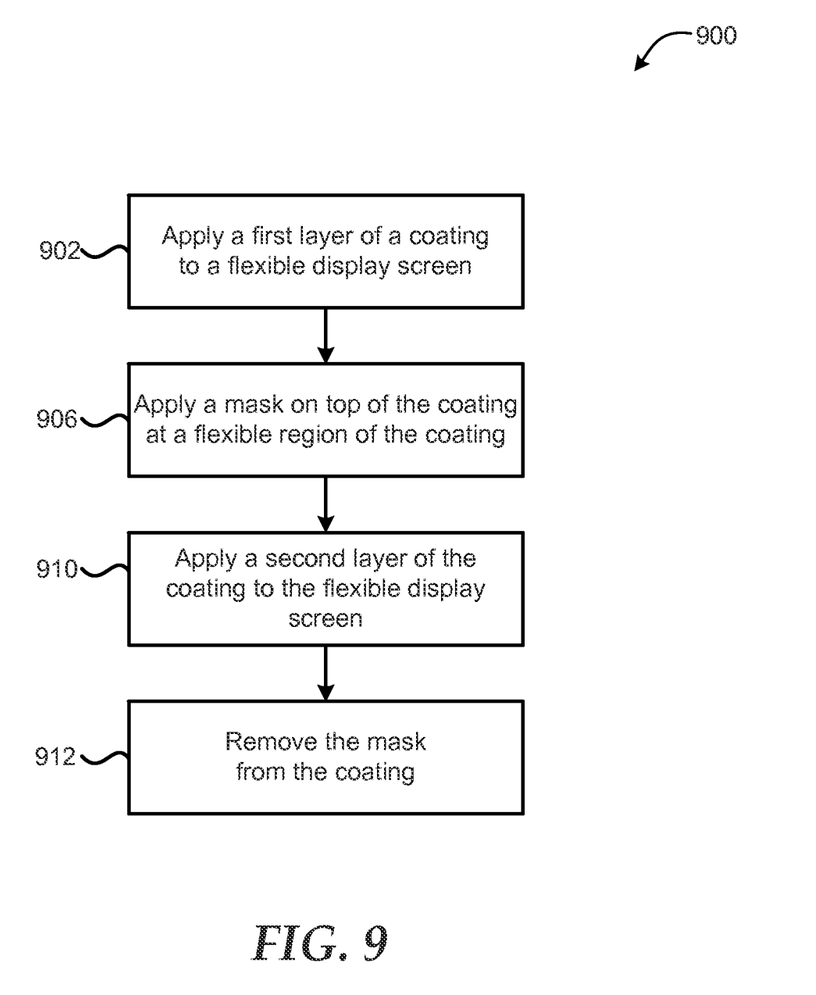
FIG. 9 is a flow diagram of a method for creating regions of a coating on a display screen of the information handling system according to an embodiment of the present disclosure.

FIG. 9 is a flow diagram of a method for creating regions of a coating on a display screen of the information handling system according to an embodiment of the present disclosure. The flow begins at block 902 and a first coating layer is applied to a flexible display screen of the information handling system. A mask is applied on top of the first coating layer at block 906. In an embodiment, the mask can be a single mask strip that is aligned with a hinge of the information handling system. In another embodiment, the mask can be multiple strips applied across the hinge area of the information handling system.

At block 910, a second coating layer is applied to the first coating layer. In an embodiment, the mask prevents the second coating layer from being applied either to the entire region of the first coating layer that is aligned with the hinge. In another embodiment, the mask prevent the second coating layer from being applied to particular strip of the first coating layer within a region aligned with the hinge. The mask is removed at block 912. In an embodiment, the portion of the coating that only has a first coating layer can have a hardness level that is less than the hardness level of the portion of the coating that has both the first coating layer and the second coating layer. Only two coating layers have been described, additional coating layers can be added to vary the hardness levels in the different regions of the coating without varying from the scope of this disclosure.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a flexible display screen having first and second surfaces, and a first hardness level;
   first and second display platforms, the flexible display screen movably mounted to the first and second display platforms along the second surface; and
   a coating in physical communication with the first surface of the flexible display screen, the coating including:
      a first region having a second hardness level greater than the first hardness level of the flexible display screen;
      a second region having a third hardness level, the third hardness level being greater than the second hardness level; and
   a cover in physical communication with a back surface of the first display platform opposite of the flexible display screen and a back surface of the second display platform opposite of the flexible display screen, the cover includes a third region having a fourth hardness level being greater than the first hardness level.

2. The information handling system of claim 1, wherein the second hardness level of the first region varies from the third hardness level of the second region based on a thickness of the coating on first region relative to the second region.

3. The information handling system of claim 1, wherein the cover further includes a fourth region having a fifth hardness level, the fifth hardness level being less than the fourth hardness level.

4. The information handling system of claim 1, further comprising:
   an orientation sensor located within the cover, the orientation sensor to detect flexing of the cover, and to provide a signal indicating an amount of flexing to the information handling system.

5. The information handling system of claim 3, wherein the orientation sensor is selected from a pressure sensor and a strain sensor.

6. The information handling system of claim 3, further comprising:
   a basic input/output system to communicate with the orientation sensor, the basic input/output system to receive the signal, and to determine, via a processor, an angle between the first and second display platforms based on the signal.

7. The information handling system of claim 1, wherein the first region is located proximate to a hinge connecting the first and second display platforms of the information handling system.

8. The information handling system of claim 1, wherein the first region includes:
   a plurality of sub-regions, a hardness level of each of the plurality of sub-regions alternates from a high hardness level to a low hardness level.

9. The information handling system of claim 8, wherein the high hardness level sub-regions are approximately equal to the third hardness level.

10. An information handling system comprising:
    a flexible display screen having first and second surfaces, and a first hardness level;
    first and second display platforms, the flexible display screen movably mounted to the first and second display platforms along the second surface; and
    a coating in physical communication with the first surface of the flexible display screen, the coating including:
       a first region of the flexible display screen including a plurality of sub-regions, a hardness level of each of the plurality of sub-regions alternates from a high hardness level to a low hardness level, wherein the high hardness level and the low hardness level are both greater than the first hardness level of the flexible display screen; and
       at least one sub-region having a third hardness level, the third hardness level being different than the high hardness level, low hardness level, and the first hardness level.

11. The information handling system of claim 10, wherein the hardness level of each of the sub-regions varies based on a thickness of the sub-regions.

12. The information handling system of claim 10, wherein the hardness level of each of the sub-regions varies based on a material composition of the sub-regions.

13. The information handling system of claim 10, wherein a transition of one of the sub-regions to the next is undetectable by a human finger is based on a width of each of the sub-regions.

14. The information handling system of claim 10, further comprising:

a cover in physical communication with an edge of the first display platform opposite of the flexible display screen and an edge of the second display platform opposite of the flexible display screen, the first region having a sub-region having a fourth hardness level, the fourth hardness level being greater than the first hardness level.

15. The information handling system of claim 14, further comprising:
an orientation sensor located within the cover, the orientation sensor to detect flexing of the cover, and to provide a signal indicating an amount of flexing to the information handling system.

16. The information handling system of claim 10, further comprising:
a basic input/output system to communicate with the orientation sensor, the basic input/output system to receive the signal, and to determine, via a processor, an angle between the first and second display platforms based on the signal.

17. A method for providing a coating on a flexible display screen of an information handling system, the method comprising:
applying a first coating layer of a coating to a first surface of the flexible display screen, wherein the flexible display screen has a first hardness level and the first coating layer on the flexible display screen has a second hardness level greater than the first hardness level;
applying a mask on top of the first coating layer;
applying a second coating layer of the coating to the first coating layer, wherein the mask prevents the second coating layer from being applied to a masked region of the first coating layer where the mask is applied, wherein the second coating layer with the first coating layer in unmasked regions has a third hardness level greater than the second hardness level;
removing the mask from the coating;
movably mounting the flexible display screen to first and second display platforms along a second surface; and
operatively coupling a cover to a back surface of the first display platform and the second display platform opposite of the flexible display screen, the cover including a cover region having a fourth hardness level being greater than the first hardness level.

18. The method of claim 17, wherein the mask further prevents the second coating layer from being applied to particular strips of the first coating layer within a region aligned with a hinge.

19. The method of claim 17, wherein the wherein the mask prevents the second coating layer from being applied to a plurality of sub-regions of the first coating layer within a region aligned with a hinge.

20. The method of claim 17, wherein the cover region further includes a cover-subregion aligned with a hinge having a fifth hardness level, the fifth hardness level being less than the fourth hardness level.

* * * * *